(12) United States Patent
Felber et al.

(10) Patent No.: US 6,749,657 B2
(45) Date of Patent: Jun. 15, 2004

(54) FILTER SYSTEM

(75) Inventors: Uwe Felber, Abtsteinach (DE); Björn Boschert, Ditzingen (DE); Christoph Malig, Weinheim (DE); Tilo Rinckleb, Tamm (DE); Dieter Schöttmer, Dortmund (DE)

(73) Assignees: Carl Freudenberg KG, Weinheim (DE); Behr GmbH & Co., Stuttgart (DE)

( * ) Notice: Subject to any disclaimer, the term of this patent is extended or adjusted under 35 U.S.C. 154(b) by 56 days.

(21) Appl. No.: 10/150,246

(22) Filed: May 16, 2002

(65) Prior Publication Data

US 2003/0005671 A1 Jan. 9, 2003

(30) Foreign Application Priority Data

May 17, 2001 (DE) .......................................... 101 23 969

(51) Int. Cl.⁷ ............................................... B01D 46/52
(52) U.S. Cl. .................... 55/497; 55/357; 55/385.3; 55/481; 55/500; 55/502; 55/503; 55/521
(58) Field of Search ................................ 55/357, 385.3, 55/478, 481, 495, 497, 500, 502, 503, 504, 521, DIG. 28; 123/198 E

(56) References Cited

U.S. PATENT DOCUMENTS

| | | | | | |
|---|---|---|---|---|---|
| 4,773,922 A | * | 9/1988 | Ross et al. | ..................... | 55/481 |
| 4,900,344 A | * | 2/1990 | Lansing | ........................ | 55/481 |
| 4,925,468 A | * | 5/1990 | Kishi et al. | .................... | 55/497 |
| 5,595,582 A | * | 1/1997 | Junker | ......................... | 55/497 |
| 5,639,287 A | * | 6/1997 | Van de Graaf et al. | .... | 55/385.3 |
| 5,740,774 A | * | 4/1998 | Kennedy | ................ | 123/198 E |
| 5,865,863 A | * | 2/1999 | DeSousa et al. | ........... | 55/385.3 |
| 6,033,453 A | * | 3/2000 | Weddell, III | .................. | 55/497 |
| 6,056,809 A | * | 5/2000 | Chapman | ..................... | 55/521 |
| 6,398,838 B1 | * | 6/2002 | Kaffenberger | ................ | 55/502 |
| 6,419,718 B1 | * | 7/2002 | Klug et al. | .................... | 55/502 |

* cited by examiner

Primary Examiner—Duane Smith
Assistant Examiner—Jason M. Greene
(74) Attorney, Agent, or Firm—Kenyon & Kenyon

(57) ABSTRACT

A filter system, including a folded filter (1) and a cover (2) of a filter housing (3), the folded filter (1) and the cover (2) forming a preassemblable unit (4) and being essentially sealingly joined to each other so as to be detachable without destruction.

20 Claims, 4 Drawing Sheets

FILTER SYSTEM

BACKGROUND OF THE INVENTION

1. Field of the Invention

The invention relates to a filter system, including a folded filter and a cover of a filter housing.

2. Description of Related Art

A filter system of this type is familiar. In this context, the folded filter is first mounted in the filter housing as a separate part, the assembly opening of the filter housing subsequently being closed by the cover. The cover and the folded filter are sealed off from each other using a separately produced seal.

In this context, however, it should be noted that the assembly of a filter system of this type is hardly satisfactory. The spatial orientation and/or the sealing of the folded filter and cover with respect to each other are essentially dependent on the abilities and the reliability of the assembly worker, incorrectly assembled folded filters and/or covers frequently leading to undesirable leakages and/or a flow short-circuit between the inflow and outflow sides of the folded filter. The assembly expense at the conveyor belt and given the poor accessibility of the filter housing is considerable.

SUMMARY OF THE INVENTION

It is an object of the invention to provide an improved filter system of the type cited above, such that it has a simple and unified design and is therefore simple and cost-effective to manufacture. It is a further object of the invention to provide such a filter system wherein the danger of assembly errors is reduced to a minimum and the folded filter is particularly easy to replace, as needed.

These and other objects of the invention are achieved by a filter system, including a folded filter (1) and a cover (2) of a filter housing (3), the folded filter (1) and the cover (2) forming a preassemblable unit (4) and being essentially sealingly joined to each other so as to be detachable without destruction.

BRIEF DESCRIPTION OF THE DRAWINGS

The present invention will be described in greater detail with reference to the following drawings wherein.

DETAILED DESCRIPTION OF THE INVENTION

Figure 1:
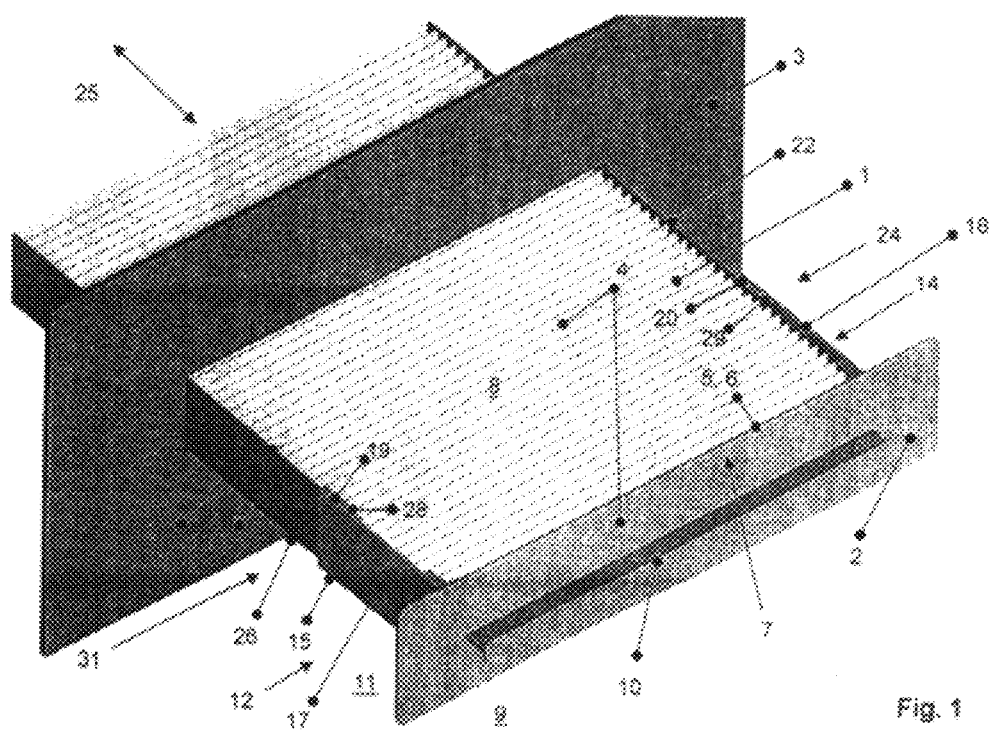
FIG. 1 depicts an exemplary embodiment of the filter system according to the present invention, the preassemblable unit being partially inserted into a filter housing.

To achieve this objective, a filter system is provided which includes a folded filter and a cover of a filter housing, the folded filter and the cover constituting a preassemblable unit and being joined to each other in an essentially sealing fashion so as to be detachable without destruction. In this context, it is advantageous that the filter system is essentially composed of only three parts, namely, the folded filter, which along with the cover forms the preassemblable unit, and the filter housing, into which the preassemblable unit can be inserted. In this context, it is also important to mention the advantage that the folded filter and the cover, which constitute the preassemblable unit, are both joined to each other as well as sealed off from each other. As a result of the nondestructively detachable connection of the folded filter on the cover, the folded filter can be easily replaced, as needed; the cover can be reused virtually indefinitely. The filter system is especially advantageous due to its simplicity when the folded filter is sealingly joined to the cover in a direct manner, i.e., by avoiding the use of a separately manufactured seal. As a result of the preassemblable unit composed of only two parts, assembly errors and assembly time are significantly reduced.

The folded filter and the cover can be joined to each other in a form- and/or force-locking manner. A force-locking connection between folded filter and cover can be achieved, for example, by arranging the folded filter in the guide rail of the cover in an exclusively frictionally engaged manner. In addition or alternatively, the folded filter can be joined to the cover in a form-locking manner. For this purpose, it can be provided that the cover and/or the folded filter have, for example, a projection, which engages in an undercut of the folded filter and/or the cover.

With regard to the folded filter, which with reference to the cover is comparatively sensitive and which can be composed of a non-woven fabric, preference is given in the context of the present invention to a mainly form-locking connection between folded filter and cover. The mechanical stresses on the folded filter during assembly are substantially reduced as a result.

The cover can be made of a polymer material. If the filter system is used, for example, in motor vehicles as a vehicle interior filter, it is advantageous that the cover be rust-free despite exposure to humidity. In addition, a cover made of a polymer material is lighter in comparison to covers made of a metallic material, which promotes a lower overall weight of the vehicle in connection with other light construction parts. In addition, the recycling of polymer materials is possible at a slight cost of energy.

The cover can have a tongue, which is essentially sealingly arranged in the last fold of the end face of the folded filter, facing the cover. The tongue of the cover has two functions. First, as a result of its form-locking arrangement in the fold of the folded filter, the tongue brings about a loss-proof orientation of the components of the preassemblable unit. The folded filter is fixed in its longitudinal direction on the cover. Furthermore, in addition to securing against loss as described above, the tongue forms the seal between the cover and the filter. During normal use of the filter system, the tongue contacts the folded filter in an essentially sealing manner, so that there is no need for a separately produced seal, for example, made of foam material. Cost-effective manufacturing and simple assembly of the filter system are promoted as a result.

The tongue can be arranged on the inflow side of the folded filter in the final end-face-side fold. As a result, the tongue forms a support abutment with respect to a further support, which is arranged on the outflow side of the folded filter.

The cover and the tongue can be configured in one piece and can be made of the same material. The achievement of the objective noted above is favored by a configuration of this type, because the entire filter system has a simple design using few parts and is therefore cost-effective to manufacture, assembly errors being substantially excluded by the unified design. In addition, only a few different materials are used, so that the filter system can be recycled easily.

The tongue can be configured essentially in an L-shape. As a result, it is especially easy to thread into the tongue the final fold of the end face of the folded filter, facing the cover.

On the side facing the folded filter, the cover can have a grip handle for assembling or disassembling the preassemblable unit, the cover and the grip being also configured in one piece and made of the same material. As a result of the grip, handling the preassemblable unit is improved. It is not necessary that the preassemblable unit contact the filter housing on the folded filter during assembly. Damage to the folded filter and impairments of functioning thus caused by assembly are substantially excluded.

On the side facing the folded filter, the cover can have a support for mounting the folded filter on the cover. As was indicated above, due to the one-piece and unified-material configuration of the tongue and the cover and/or the grip and the cover, a simple and cost-effective design, simple assembly as a result of avoiding the need to have many, separately manufactured components, and good recycling capacity are of decisive advantage.

The support can be formed by two longitudinal bars at least partially extending under the longitudinal sides of the folded filter on the outflow side. As a result of the fact that both longitudinal sides of the folded filter are grasped from below by the longitudinal bars on the outflow side, a precise positioning of the folded filter is achieved with respect to the cover. In contrast, the use of only one longitudinal bar would promote a skewed orientation of the folded filter with respect to the cover and, as a result, would possibly lead to impairments in functioning. Specifically, with respect to sealing off the folded filter using the tongue, a precise orientation of the folded filter with respect to the cover is especially expedient.

The support can be formed by two retaining braces which at least partially, in a U shape, surround the longitudinal sides of the folded filter. The longitudinal bars can be a component part of the retaining braces. The precise positioning of the folded filter with regard to the cover is further improved by a configuration of this type, it being possible to provide the retaining braces on the side facing the folded filter, in each case, with a surface profiling, which the longitudinal sides of the folded filter contact, as a result, in addition to the form-locking connection via the tongue, which engages the final fold of the end face of the folded filter, bringing about a force-locking connection. As a result of the retaining braces, the inflow-side and the outflow-side border of at least one part of the longitudinal sides of the folded filter is covered.

The support on at least one longitudinal side of the folded filter can have at least one elastically flexible latching cog, which at least partially covers the inflow-side border of the corresponding longitudinal side. However, each longitudinal side of the folded filter is preferably at least partially covered on the inflow-side by at least one elastically flexible latching cog. With regard to simplicity of handling, it is advantageous that the folded filter can be snapped into the support using the latching cogs. The assembly of the folded filter and the cover preferably takes place such that the folded filter at its final inflow-side fold is threaded under the tongue of the cover and is subsequently tilted in the direction of the support until the outflow-side longitudinal side of the folded filter rests upon the support. When the longitudinal sides of the folded filter contact the support, the initially elastically expanded latching cogs engage in a barbed manner over the intake-side border of the longitudinal side of the folded filter and, as a result, produce a loss-proof joining of the folded filter to the cover, the two parts constituting the preassemblable unit. To separate the folded filter from the cover, the latching cogs are elastically deformed in opposition to their engagement direction until they release the inflow-side border of the folded filter, and the filter is swiveled in opposition to the assembly direction until the final inflow-side fold can be extended under the tongue, and the folded filter, as a result, can be separated from the cover without destruction.

In FIG. 1, an exemplary embodiment of the filter system according to the present invention is depicted. The folded filter 1, which is composed of a pleated, nonwoven fabric and which in the area of its longitudinal sides 13, 14, in each case, has an edge 23, 24 that is glued or soldered on, constitutes preassemblable unit 4 together with cover 2, which in this exemplary embodiment is made of a polymer material. Preassemblable unit 4 during its normal use is inserted into filter housing 3, such that folded filter 1 is completely surrounded by filter housing 3, and cover 2 sealingly contacts filter housing 3 on its end face. Folded filter 1 and cover 2 contact each other directly in a sealing manner in the area of final, end-face-side fold 6 of folded filter 1 on the inflow side, and of tongue 5 of cover 2. Because the folded filter is a part that is subject to wear, which can be replaced, as needed, individually and simply, folded filter 1 is joined to cover 2 in a detachable and destruction-free manner.

In the exemplary embodiment depicted here, folded filter 1 is joined to the cover in a form-locking manner, the form lock being formed by tongue 5, which on inflow side 8 engages final end-face-side fold 6, and by latching cogs 19, 20. Latching cogs 19, 20 hold folded filter 1 down on longitudinal bars 15, 16 of support 12. Tongue 5 brings about a loss-proof orientation of folded filter 1 on cover 2 in longitudinal direction 25 of folded filter 1, whereas support 12 fixes folded filter 1 spatially in the two other directions, with respect to cover 2.

For the disassembly of folded filter 1 from cover 2, latching cogs 19, 20 of retaining braces 17, 18 are deformed elastically to the outside, on a diagonal with respect to longitudinal direction 25, until they release intake-side borders 21, 22 of longitudinal sides 13, 14 of folded filter 1. Subsequently, folded filter 1 can be tilted in the direction of the viewer, past latching cogs 19, 20, beginning from the end facing away from cover 2, until tongue 5 and final, end-face-side fold 6 of folded filter 1 have come out of engagement, and folded filter 1 as well as cover 2, as a result, are detachable from each other without destruction.

The assembly of folded filter 1 and cover 2, forming preassemblable unit 4, takes place such that folded filter 1 in its final end-face-side fold 6 on inflow-side 8 is threaded under tongue 5 of cover 2. Simultaneously, folded filter 1 and cover 2, in accordance with their configuration, form roughly an angle of 30° to 75° with respect to each other. Subsequently, folded filter 1 is tilted in the direction of support 12 until outflow-side borders 26, 27 of longitudinal sides 13, 14 contact longitudinal bars 15, 16. As soon as outflow-side borders 26, 27 of longitudinal sides 13, 14 contact longitudinal bars 15, 16, latching cogs 19, 20 snap into place, forming a component part of retaining braces 17, 18, configured as support 12, over inflow-side borders 21, 22 of longitudinal sides 13, 14. Preassemblable unit 4 is now finished, and ready to be installed in filter housing 3.

Arranged on side 9 of cover 2 facing away from folded filter 1, is grip 10, which constitutes a one-piece and material-unified component of cover 2. Grip 10 makes the assembly or disassembly of preassemblable unit 4 and filter housing 3 easier.

Figure 2:
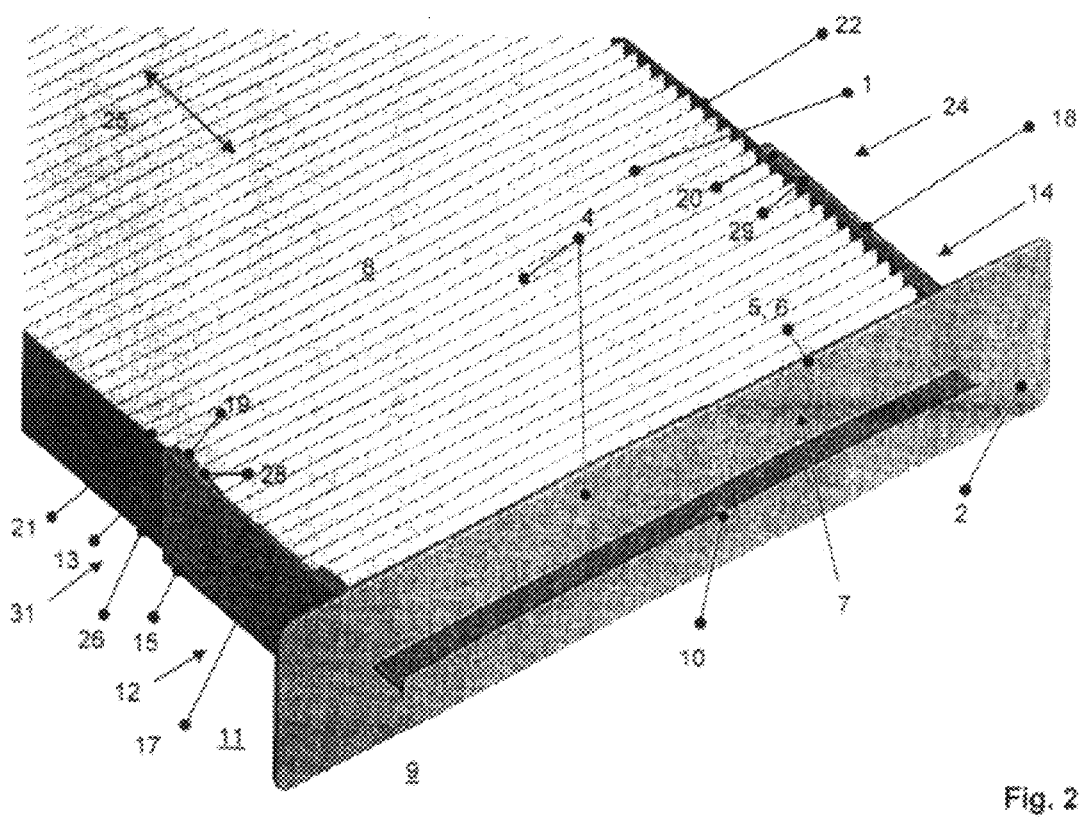
FIG. 2 depicts an enlarged segment of the preassemblable unit from FIG. 1.

In FIG. 2, a segment from preassemblable unit 4 in FIG. 1 is depicted in an enlarged representation. Latching cogs 19, 20 on the side facing cover 2 each have a limit slant 28, 29, which brings it about that folded filter 1, in its assembly along with cover 2 to form preassemblable unit 4, automatically elastically expands retaining braces 17, 18 diagonally with respect to longitudinal direction 25. The assembly of folded filter 1 and cover 2 is significantly simplified as a result.

Figure 3:
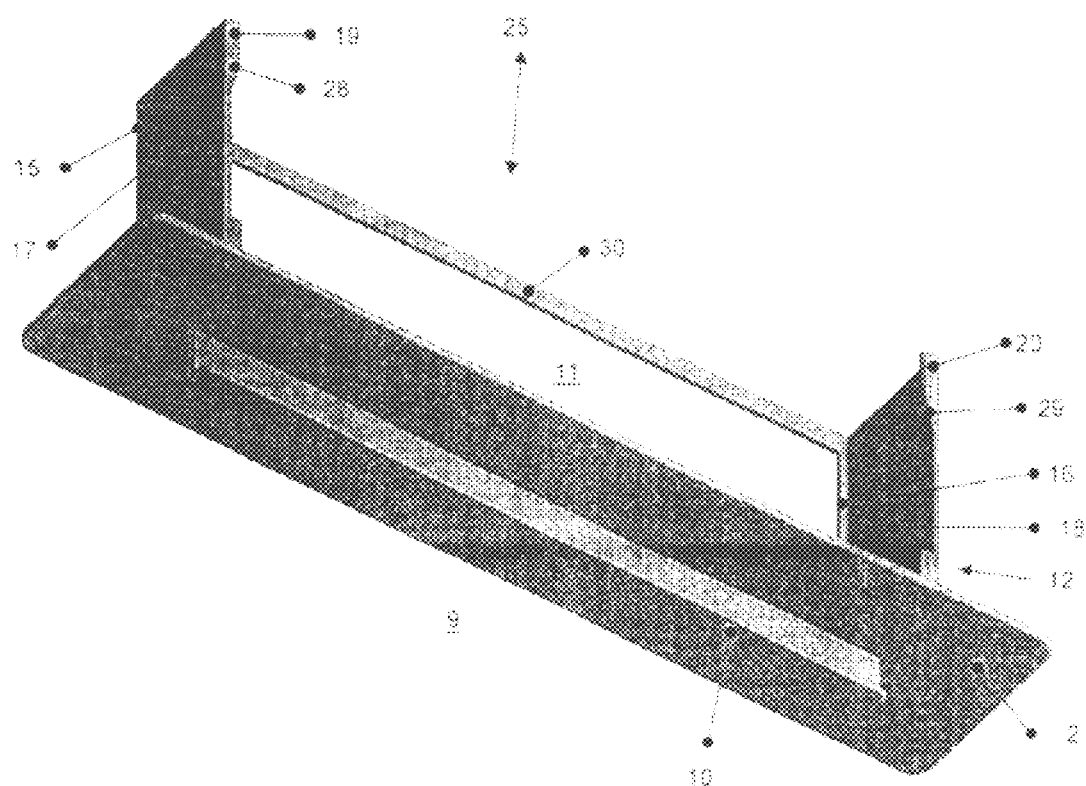
FIG. 3 depicts the cover as an individual part in a perspective representation seen diagonally from above.

In FIG. 3, cover 2 is depicted in a perspective representation as seen as an individual part diagonally from above. Both retaining braces 17, 18 are joined on the side facing away from latching cogs 19, 20 by a connecting bar 30, which provides additional dimensional stability for retaining braces 17, 18, which are configured in one piece, merge into each other, and have the same material as cover 2, and, as a result, provides a sufficient prestressing of retaining braces 17, 18 on longitudinal sides 13, 14 of folded filter 1.

Figure 4:
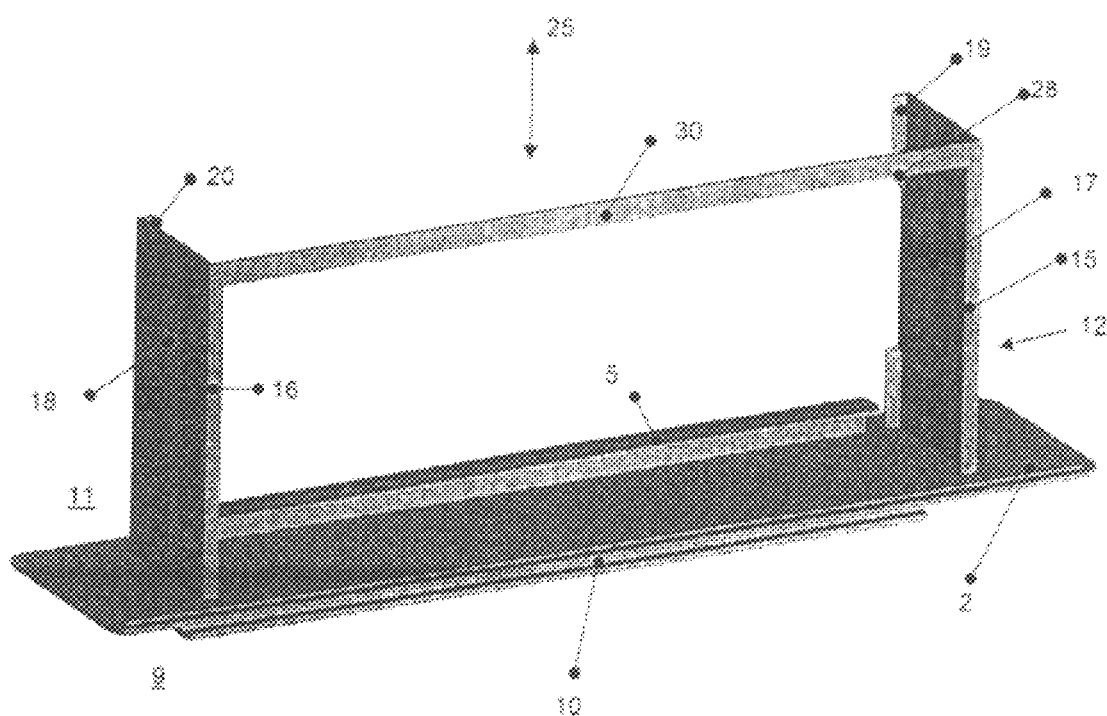
FIG. 4 depicts the cover from FIG. 3 in a perspective view seen diagonally from below.

In FIG. 4, cover 2 is depicted diagonally from below. Arranged on the side of cover 2 facing grip 10 is L-shaped tongue 5, which, on inflow-side 8 of folded filter 1 in final end-face-side, sealingly engages fold 6 of folded filter 1. During normal use of the filter system, the inflow-side final edge of final end-face-side fold 6 sealingly contacts tongue 5 and, as a result, prevents leakage. In addition, tongue 5 furnishes protection against loss and prevents filter 1 from slipping in longitudinal direction 25 out of retaining braces 17, 18 of cover 2.

What is claimed is:

1. A filter system, comprising: a folded filter (1) and a cover (2) of a filter housing (3), the folded filter (1) and the cover (2) forming a preassemblable unit (4) and being essentially sealingly joined to each other so as to be detachable without destruction; and a support connected to the cover, the folded filter configured to have longitudinal edges which contact the support, wherein latching clogs of the support engage in a barbed manner over an intake-side border of a longitudinal side of the folded filter.

2. The filter system according to claim 1, wherein the folded filter (1) and the cover (2) are joined to each other in a force- or form-locking manner.

3. The filter system according to claim 1, wherein the cover (2) is made of a polymer material.

4. The filter system according to claim 2, wherein the cover (2) is made of a polymer material.

5. A filter system, comprising: a folded filter (1) and a cover (2) of a filter housing (3), the folded filter (1) and the cover (2) forming a preassemblable unit (4) and being essentially sealingly joined to each other so as to be detachable without destuction wherein the cover (2) has a tongue (5), which is essentially sealingly arranged in a final fold (6) of an end face (7) of the folded filter (1), facing the cover (2).

6. A filter system, comprising: a folded filter (1) and a cover (2) of a filter housing (3), the folded filter (1) and the cover (2) forming a preassemblable unit (4) and being essentially sealingly joined to each other so as to be detachable without destuction wherein the cover (2) has a tongue (5), which is essentially sealingly arranged in a form-locking manner, wherein the cover (2) has a tongue (5), which is essentially sealingly arranged in a final fold (6) of an end face (7) of the folded filter (1), facing the cover (2).

7. A filter system, comprising: a folded filter (1) and a cover (2) of a filter housing (3), the folded filter (1) and the cover (2) forming a preassemblable unit (4) and being essentially sealingly joined to each other so as to be detachable without destuction wherein the cover (2) is made of a polymer material wherein the cover (2) has a tongue (5), which is essentially sealingly arranged in a final fold (6) of an end face (7) of the folded filter (1), facing the cover (2).

8. The filter system according to claim 5, wherein the tongue (5) is arranged on an inflow-side (8) of the folded filter (1) in the final end-face-side fold (6).

9. The filter system according to claim 5, wherein the cover (2) and the tongue (5) are configured in one piece and are made of the same material.

10. The filter system according to claim 5, wherein the tongue (5) is configured in an essentially L shape.

11. The filter system according to claim 5, wherein the cover (2) on a side facing (8) away from the folded filter (1) has a grip (10) for assembling or disassembling the preassemblable unit (4).

12. The filter system according to claim 11, wherein the cover (2) and the grip (10) are configured in one piece and are made of the same material.

13. The filter system according to claim 1, wherein the cover (2) and the support (12) are configured in one piece and are made of the same material.

14. A filter system, comprising: a folded filter (1) and a cover (2) of a filter housing (3), the folded filter (1) and the cover (2) forming a preassemblable unit (4) and being essentially sealingly joined to each other so as to be detachable without destuction wherein the cover (2) on the side (11) facing the folded filter (1) has a support (12) for mounting the folded filter (1) on the cover (2) wherein the support (12) is formed by two longitudinal bars (15, 16) extending at least partially under longitudinal sides (13, 14) of the folded filter (1) on an outflow side.

15. A filter system, comprising: a folded filter (1) and a cover (2) of a filter housing (3), the folded filter (1) and the cover (2) forming a preassemblable unit (4) and being essentially sealingly joined to each other so as to be detachable without destuction wherein the cover (2) on the side (11) facing the folded filter (1) has a support (12) for mounting the folded filter (1) on the cover (2) wherein the support (12) is formed by two retaining braces (17, 18) that at least partially surround, in a U shape, longitudinal sides (13, 14) of the folded filter (1).

16. The filter system according to claim 14, wherein the support (12) is formed by two retaining braces (17, 18) that at least partially surround, in a U shape, longitudinal sides (13, 14) of the folded filter (1).

17. The filter system according to claim 16, wherein the longitudinal bars (15, 16) constitute a component part of the retaining braces (17, 18).

18. A filter system, comprising: a folded filter (1) and a cover (2) of a filter housing (3), the folded filter (1) and the cover (2) forming a preassemblable unit (4) and being essentially sealingly joined to each other so as to be detachable without destuction wherein the cover (2) on the side (11) facing the folded filter (1) has a support (12) for mounting the folded filter (1) on the cover (2) wherein the support (12) on at least one longitudinal side (13, 14) of the folded filter (1) has at least one elastically flexble latching cog (19, 20) which at least partially covers an intake-side border (21, 22) of the corresponding longitinal side (13, 14).

19. A filter system, comprising: a folded filter (1) and a cover (2) of a filter housing (3), the folded filter (1) and the cover (2) forming a preassemblable unit (4) and being essentially sealingly joined to each other so as to be detachable without destuction wherein the cover (2) on the side (11) facing the folded filter (1) has a support (12) for mounting the folded filter (1) on the cover (2) wherein each longitudinal side (13, 14) of the foled filter (1) is at least partially covered on an intake side by, in each case, at least one elastically flexble laching cog (19, 20).

20. The filter system according to claim 19, wherein the folded filter (1) can be snapped into the support (12) using the latching cog (19, 20).

* * * * *